July 16, 1963   A. THALER ETAL   3,097,390
HOLDING DEVICE FOR SCRAPER BLADES OF ROLLER MILLS
Filed Sept. 25, 1961   2 Sheets-Sheet 1

INVENTORS:
ANTON THALER
ALFRED SIEBERT
BY
M. Glew and Toren
ATTORNEYS

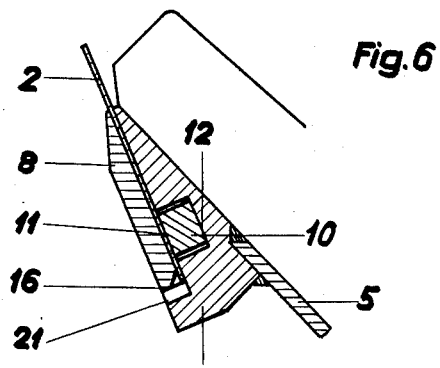
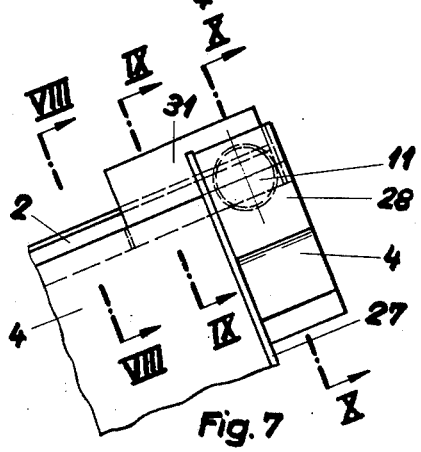
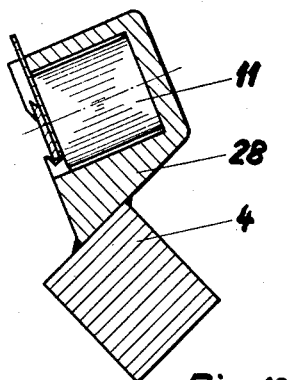
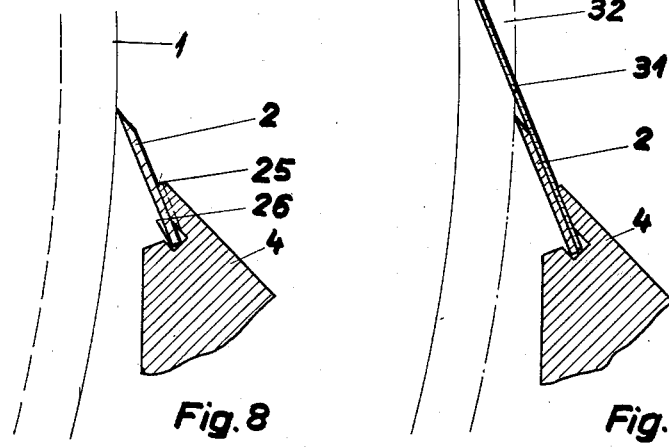
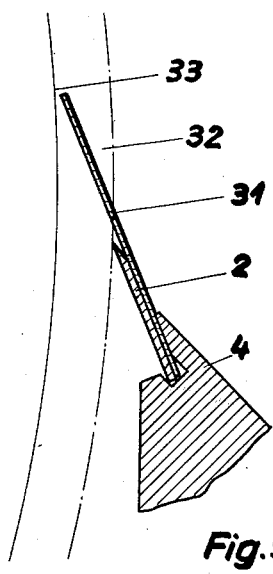

United States Patent Office 3,097,390
Patented July 16, 1963

3,097,390
HOLDING DEVICE FOR SCRAPER BLADES OF ROLLER MILLS
Anton Thaler, Unterdorf, Waldkirch, and Alfred Siebert, Niederuzwil, Switzerland, assignors to Gebrueder Buehler, Uzwil, Switzerland, a firm of Switzerland
Filed Sept. 25, 1961, Ser. No. 141,266
Claims priority, application Switzerland Sept. 27, 1960
13 Claims. (Cl. 15—256.51)

Fastening of the scraper blades, as used in rolling mills, on their movable holders has hitherto been effected by means of some clamping device or screw fasteners. In case of demounting such fasteners have to be unscrewed, which usually involves relatively time-consuming operations while projecting parts entail the danger of fouling.

An object of this invention is to provide a holding device for scraper blades used in roller mills, enabling easy and quick replacement of the blades.

Another object of this invention consists in providing a clamping device for scraper blades used in roller mills, wherein projecting parts are avoided.

This invention provides means to eliminate the above mentioned disadvantages. They consist in a holding device, for scraper used in roller mills, comprising a magnet and cooperating magnetizable elements for clamping the scraper blades between them.

Figure 1:
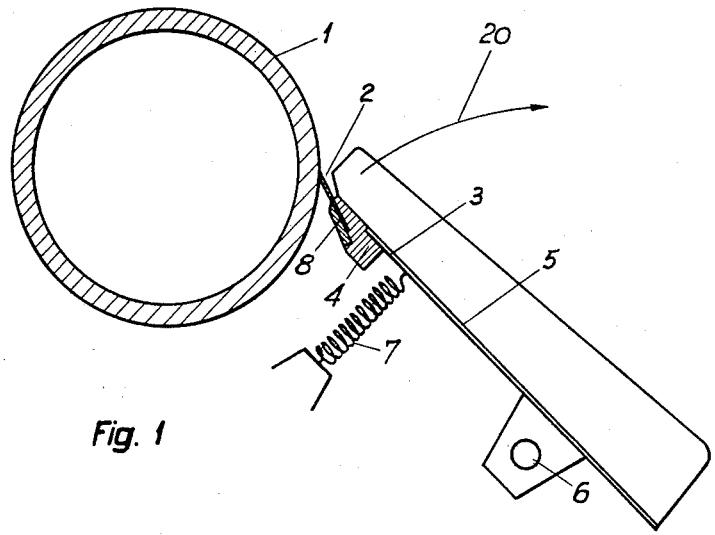
Figures 2, 5:
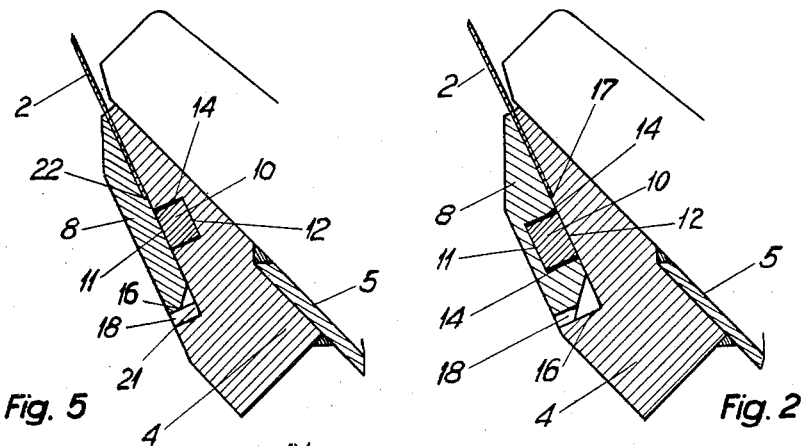
Figures 3, 4:
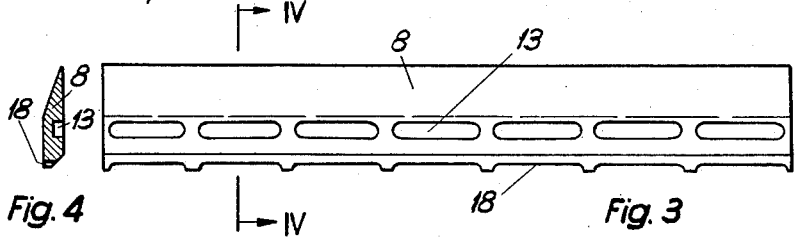

Various embodiments of this invention are shown by way of examples in the accompanying drawings, wherein:

FIG. 1 is a sectional view of a general arrangement of the scraper,

FIG. 2 is a sectional view, on an enlarged scale, of the scraper blade fastening device according to one embodiment of this invention, FIG. 3 is a plan view, on a smaller scale, of the blade clamping bar, FIG. 4 is a sectional view along the line IV—IV of FIG. 3, FIG. 5 is a sectional view similar to FIG. 2, but illustrating a second embodiment of this invention, FIG. 6 is a sectional view similar to FIG. 2, but illustrating a third embodiment of the invention, FIG. 7 is a plan view at the fastener side, of a still further embodiment, FIG. 8 is a sectional view along the line VIII—VIII of FIG. 7, FIG. 9 is a sectional view along the line IX—IX of FIG. 7, and FIG. 10 is a sectional view along the line X—X of FIG. 7.

The material processed by roll 1, shown in FIG. 1, will be removed by a scraper blade 2 mounted on a holder 3, comprising a scraper blade supporting bar 4 and a discharge chute 5 of folded sheet metal. Holder 3 is pivotably mounted on bearing 6, while its setting is adjusted by means not shown in the drawings. A spring member 7 acting on holder 3 presses the scraper blade 2, clamped between supporting bar 4 of holder 3 and a detachable blade clamping bar 8, against cylinder 1.

In the embodiment shown in FIG. 2, supporting bar 4 is designed as a magnetic element, against which clamping bar 8 is pulled by magnet 10 having pole faces 11 and 12. The magnet 10 is subdivided lengthwise and arranged in a recess 13 (FIG. 3). The lateral faces 14 of magnet 10 are fixed in clamping bar 8 by means of an adhesive bond. The scraper blade 2 is clamped between clamping bar 8 and a recessed surface of a V-shaped section of supporting bar 4, while the magnet 10 is disposed inwardly of blade 2 in such V-shaped section.

A banking face or shoulder 16 in supporting bar 4 determines the position of the clamping bar 8, while another banking face or shoulder 17 determines the position of scraper blade 2. Recesses 18 are arranged in clamping bar 8.

In order to remove scraper blade 2, e.g. for replacement, holder 3 is tilted in the sense indicated by an arrow 20 shown in FIG. 1. The clearance provided between supporting bar 4 and clamping bar 8 enables simple extraction of the scraper blade 2.

In case the holding device requires cleaning, which will occur less frequently than replacement when processing uniform material, a lever (not shown in the drawings) can be introduced in the recesses 18 between clamping bar 8 and supporting bar 4, and clamping bar 8 thus shifted ahead. The direction of this shift being parallel to the pole face 12 of magnet 10 the shifting force required is much smaller than in the direction of the magnetic pull, perpendicular to pole face 12.

In the embodiment shown in FIG. 5, magnet 10 is disposed in supporting bar 4. Clamping bar 8 serves as a magnetizable element. In supporting bar 4 recesses 21 are arranged for the introduction of a demounting tool (not shown in the drawings) between supporting bar 4 and clamping bar 8. The position of scraper blade 2 is determined by banking face or shoulder 22 in clamping bar 8.

In the embodiment shown in FIG. 6, scraper blade 2 is clamped between clamping bar 8, on the one hand, and supporting bar 4 and magnet 10, on the other hand. The design is shorter and applicable in the event of lack of space, but replacement of the scraper blade 2 is less simple.

In the embodiments shown in FIGS. 7–10, FIG. 8 shows the mounting of the scraper blade 2 against the front edge 25 of supporting bar 4 and with its rear edge in groove 26 of bar 4. Magnets 11 are disposed at each side of bar 4 as shown in FIG. 7, outside of the operation area of scraper blade 2, but above the blade. The magnetizable elements include the housings 28 welded to the lateral wall 27 of the discharge chute 5 and to the supporting bar 4. The flux of each magnet 11 passes through the walls of a housing 28.

The end shoulders or faces of cylinder 1 are cleaned by auxiliary scrapers 31, disposed between scraper blade 2 and magnets 11. As shown in FIGS. 7 and 9, auxiliary scrapers 31 act against shoulders 32 of cylinder 1 without reaching recessed circumference 33 of this cylinder 1.

The advantage of this design consists in the moment of the tilting force being absorbed by special elements of bar 4. Magnets 11 are not loaded by the scraping forces but serve only to secure the position of the blade. This design avoids too near an approach of supporting bar 4 to cylinder 1, enabling the bar 4 to be inclined further towards cylinder 1. It is therefore possible to allow a greater degree of wear of scraper blade 2 before it requires replacement.

Auxiliary blades 31 are easy to mount. They pick up the material tending to leave the working surface of the cylinder 1 laterally.

What we claim is:

1. A holding device, for scraper blades used in rolling mills, comprising, in combination, a support structure, including magnetizable material, and formed with cooperating surface portions arranged to supportingly engage a surface and a rear edge of a scraper blade to position the latter with its front edge beyond said structure for engagement with a roller; permanent magnet means mounted on said support structure to provide a magnetic field including said magnetizable material, and operative to retain a scraper blade in engagement with said cooperating surface portions; and means movably mounting said support structure for displacement relative to a roller.

2. A holding device for scraper blades, as claimed in claim 1, in which said support structure includes a pair of elements of magnetizable material, one of said elements being relatively fixed and the other of said elements being removable relative to said one element; said elements having facing surfaces arranged to overlie opposite surfaces of a scraper blade, and being conjointly formed with said cooperating surface portions; said permanent magnet means comprising bar magnet means seated in a recess in one of said elements and having an outer plane surface substantially flush with the facing surface of the recessed element and facing the facing surface of the other of said elements.

3. A holding device for scraper blades, as claimed in claim 2, in which said bar magnet means comprises a bar magnet subdivided into longitudinally adjacent sections.

4. A holding device for scraper blades, as claimed in claim 2, in which said bar magnet means is seated in a recess in said relatively fixed element.

5. A holding device for scraper blades, as claimed in claim 2, in which said bar magnet means is seated in a recess in said relatively movable element.

6. A holding device for scraper blades, as claimed in claim 2, in which said cooperating surface portions are formed on said relatively fixed element and conjointly define a recess adapted to receive a portion of a scraper blade and terminating in a shoulder arranged to engage the rear edge of a scraper blade.

7. A holding device for scraper blades, as claimed in claim 2, in which said cooperating surface portions are formed on the facing surface of said relatively movable element and form a recess arranged to receive a portion of a scraper blade and terminating in a shoulder arranged to engage the rear edge of a scraper blade.

8. A holding device for scraper blades, as claimed in claim 2, in which said facing surface of said relatively fixed element comprises a surface of a relatively rectangular outwardly facing recess therein arranged to seat said movable element; said recess having a second surface extending substantially perpendicular to the facing surface of said relatively fixed element and substantially parallel to an inner edge surface of said relatively movable element; said inner edge surface of said relatively movable element and said second surface of said recess being cooperatively formed for insertion of a tool therebetween for displacing said relatively movable element, relative to said relatively fixed element, in a direction substantially parallel to the facing surfaces of said two elements.

9. A holding device for scraper blades, as claimed in claim 2, in which the facing surface of said relatively fixed element is the surface of a substantially rectangular recess having an inner surface extending substantially perpendicular to said facing surfaces and forming the surface portion arranged to engage the rear end of a scraper blade; said recess seating said relatively movable element, and said elements cooperatively providing a recess for a scraper blade to be inserted between said elements with its rear edge engaging said inner surface of said recess.

10. A holding device for scraper blades, as claimed in claim 3, in which said movable element is formed with a series of longitudinally spaced and aligned recesses; said bar magnet means comprising a bar magnet subdivided longitudinally into sections each secured in one of said recesses in said relatively movable element.

11. A holding device for scraper blades, as claimed in claim 1, in which said support structure comprises a support bar having a longitudinally extending notch in its outer longitudinal edge, a surface of said notch constituting said surface portion arranged to supportingly engage a surface of a scraper blade; said bar being formed with a longitudinally extending groove extending inwardly from said notch and forming said surface portion arranged to supportingly engage the rear edge of a scraper blade; said permanent magnet means comprising magnets mounted on said bar and arranged to engage portions of a scraper blade.

12. A holding device for scraper blades, as claimed in claim 11, including a pair of housings of magnetizable material each secured to a respective end of said support bar; said magnets comprising a pair of magnets each disposed in a respective one of said housings and each arranged to engage a surface of a scraper blade mounted in said support bar and projecting beyond each end thereof.

13. A holding device for scraper blades, as claimed in claim 12, in which the surface of said notch, constituting the surface portion arranged to supportingly engage a surface of a scraper blade, is recessed adjacent each end to receive an auxiliary scraper blade and support the latter with its front edge extending beyond the front edge of a main scraper blade supported in said notch, whereby auxiliary scraper blades mounted in said recessed portions of said notch surface can be mounted for engaging radial shoulders at the ends of the working cylindrical surface of a roller.

No references cited.